May 1, 1951  E. P. MILLER  2,551,035
ELECTROSTATIC DEPOSITION OF ELASTOMER MATERIAL
Filed Jan. 30, 1946
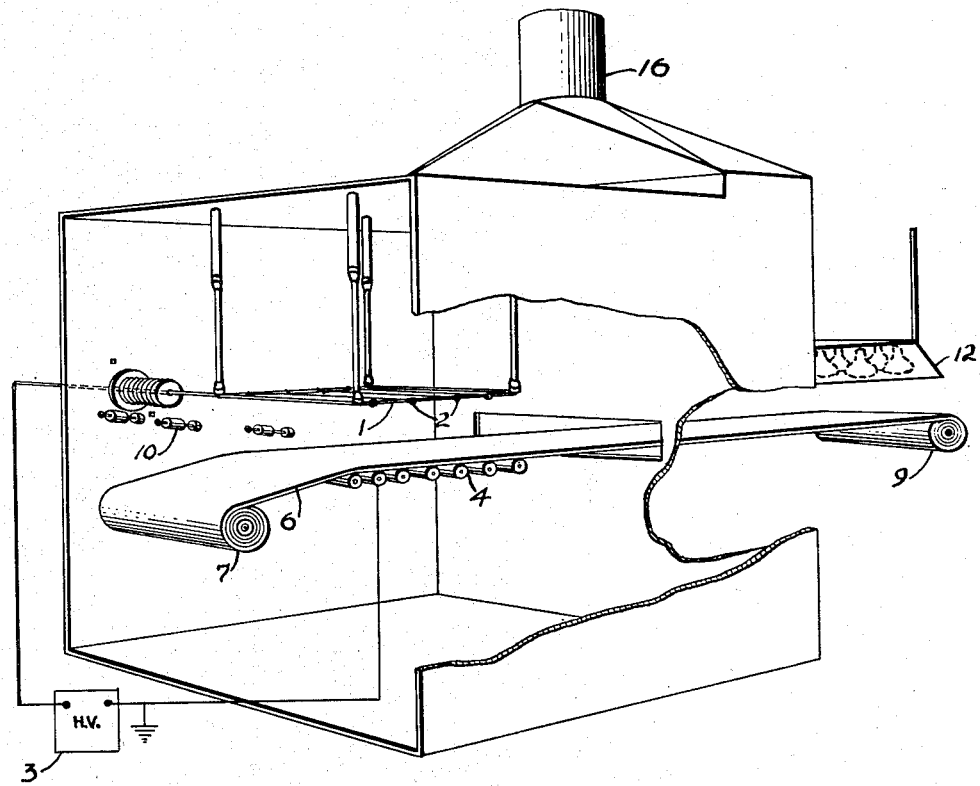
INVENTOR.
EMERY P. MILLER
BY
Lewis D. Konigsberg Patented May 1, 1951

2,551,035

UNITED STATES PATENT OFFICE 2,551,035

ELECTROSTATIC DEPOSITION OF ELASTOMER MATERIAL

Emery P. Miller, Williams Creek, Ind., assignor, by mesne assignments, to Ransburg Electro-Coating Corp., Indianapolis, Ind., a corporation of Indiana Application January 30, 1946, Serial No. 644,413

6 Claims. (Cl. 204—165)

1

This invention relates to the process of and apparatus for treating of organic elastomer materials in an electrostatic field, to the process of coating surfaces with such materials, and to the products obtained thereby.

It is an object of the invention to produce a flexible mat or a nap like coating upon a surface directly from the liquid phase in a simple and inexpensive manner.

Another object of the invention is to coagulate a solution or dispersion of a settable organic material while in the form of a spray.

Another object of the invention is to produce a matte or pileous resinous coating upon a surface.

Another object is to electrostatically deposit a liquid upon a surface to produce a resilient coating.

A further object is the production from a liquid phase of a deposit of oriented elongated particles of a settable material in an electrostatic field.

In accordance with one feature of the present invention a solution or liquid dispersion of a settable organic elastomer is treated in the form of a spray in an electrostatic field to cause it to be deposited in a flocculent or fibrous state upon a surface to be coated so as to form thereon a coating of a matte, suede or pileous character. The coating formed in an electrostatic field differs from that deposited from a direct spray, in that the particles sprayed in the absence of an electrostatic field flow out and coalesce to form a smooth or glossy surface. I believe the flocculent or fibrous state of the deposited material is due at least in part to the coagulation of the elastomer by the electrostatic field probably involving a polymerization or increase in polymerization of the elastomer, and, in addition, the electrostatic field has an elongating action on the spray particles, so that the elastomer particles build up deposits of a matte or fibrous nature on the surface. In some cases, these elongated particles can be deposited in an oriented position. However, it is not necessary, according to the present invention that electrostatic coagulation and elongation both occur.

The coating may be applied upon a surface from which it can be stripped to form a sheet or film, or it may be bonded to the surface by its own adhesive action or with the assistance of a suitable adhesive. For example in applying rubber to a metal surface, I may first apply a thin uniform layer of chlorinated rubber followed by the application of the rubber layer and vulcanization. The invention is applicable to the coating of conducting or non-conducting materials, such

2 as, for example, textile materials, such as cloth of cotton, wool, rayon, or silk; fibrous materials such as paper or leather; rubber materials such as sheets, overshoes, and the like; synthetic resin surfaces; and metal or wood surfaces. The surface to be coated may be that of a sheet, thread, rod, or of any other desired object or article.

According to another feature of the invention, a spray of a solution or dispersion of a settable organic material is introduced into an electrostatic field to cause coagulation or setting thereof. The extent of setting, coagulation or orientation of the elastomer will depend upon the nature of the elastomer and its time of exposure to the electrostatic field. The setting action of the field may be augmented by the aid of infra red rays, hot air, or other suitable physical or chemical treatment, and may be followed by a curing action in or outside of the influence of the electrostatic field.

As examples of the elastomers to which the present invention is applicable I mention natural or concentrated rubber latex, prevulcanized latex, synthetic latex, solutions of rubber in organic solvents such as petroleum ether, toluene or the like, polybutylenes, buna rubber latexes or solutions such as polybutadienes, or copolymers of butadienes with styrene or acrylonitrile, chloroprene polymers or rubber hydrochloride. The above elastomers are members of that class which may be coagulated or set by polymerization or inter-polymerization reactions to an elastic body. However, it is to be understood that the enumeration herein of elastomers is by way of example and I do not intend to exclude non-enumerated examples. Other materials such as concentrated solutions of some plastics in their appropriate solvents display the property of setting or drying into pliable fibers by evaporation alone when sprayed in an electrostatic field and such materials are to be included under the term elastomers, as used in this disclosure.

The nature of the curing action employed will depend on the elastomer and the properties desired. For example, where a prevulcanized latex is employed heating alone may be sufficient to effect curing by driving off occluded water. Or a latex incorporating various ingredients such as zinc oxide, whiting, sulfur, accelerator activators, vulcanization accelerators, paraffin wax, coloring matters, carbon black, and the like may be sprayed in the electrostatic field and then subjected to ultra-accelerators, such as zinc isopropylxanthate, zinc diethyldithiocarbamate, tetramethylthiuram disulfide or mercaptobenzothiazole, at an elevated temperature to effect vulvanization or curing. Or, a latex may be sprayed into an electrostatic field carrying vapors of a volatile acid, such as acetic acid, to assist coagulation.

The invention will be described in greater detail in connection with the accompanying drawing wherein there is diagrammatically illustrated a preferred apparatus for carrying out the invention.

Referring to the drawing, there is shown an electrode frame 1 horizontally supported from above by insulators and having strung thereon at suitable intervals appropriate ionizing electrodes 2 shown as fine wires, and one terminal of a high voltage source 3 is connected thereto. The other terminal is connected in any suitable manner to a series of supporting rollers 4 of conducting material, and may be grounded, if desired. The supporting rollers 4 eliminate to a large extent the drag due to adhesion of the belt to its support. The voltage source 3 is of a type capable of impressing the desired direct or alternating potential difference of the order of about one hundred thousand volts between the electrodes 2 and the rollers 4, which preferably are spaced apart a distance of about twelve inches. With such voltage and such spacing the average potential gradient is 8000 volts per inch of electrode separation. For some purposes, it is to be understood that a non ionizing electrostatic field may be employed.

Preferably the electrode frame is located above a sheet of material 6 which passes from feed roll 7 over supporting rollers 4 and is wound on collecting roll 9. A spray gun 10, or a bank of such guns, of any suitable type, is positioned to introduce a spray of an elastomer, such as preserved concentrated latex, into the electrostatic field between electrodes 2 and sheet 6, and the latex particles are elongated and precipitated upon the sheet to form a coagulated matte coat thereon. It is preferred to arrange the electrode frame, sheet and spray so that the force of gravity assists the deposition forces of the field. The rate of travel of the sheet over the rollers 4 and the delivery of the spray gun 10 may be regulated to produce the desired depth of coating. Where a thick porous or spongy deposit is desired, multiple units may be employed to deposit the desired coat on the sheet 6 before it is rolled.

The preferred type of spray gun is one which employs intermingling streams of liquid and air to produce a stream of dispersed liquid particles, and need not be described in detail. The drying action of the air upon the latex particles and the electrostatic field action produces a sufficient coagulation thereof as they traverse the electrostatic field, to cause the formation of a nap like surface. However, if desired, further drying may be induced by a battery of infra-red lamps indicated at 12 which may be located to heat the deposited material in the electrostatic field as it is deposited, or at any time before it is wound on the collecting roll. Also, if desired, a stream of acid vapor, such as hydrochloric acid or acetic acid may be introduced into the electrostatic field by one or more of the spray guns 10. The apparatus may be enclosed in a suitable booth, and a suitable exhaust system may be employed to carry off overspray, vapors, or acid fumes through the duct 16. By locating the exhaust opening at the opposite end of the field from the spray guns, exhaust air currents envelope the field to assist in holding the spray particles confined to the field. If desired the coated surface may be subjected to a suitable vulcanizing or curing treatment.

Various modifications in the invention may be made without departing from the spirit or scope thereof.

I claim:

1. The process of forming a mat finish product of elastomer material by depositing the elastomer material upon a base comprising establishing an electrostatic field having an average electric potential gradient of about 8,000 volts per inch of electrode separation, introducing elastomer material in particled liquid form in said field where said particles are elongated and deposited on a base.

2. The process of forming an elastomer coated product comprising the steps of creating in the atmosphere of a working zone an electrostatic field of substantial length having a local region in which the electrical gradient is adequate to produce ionization of the atmosphere, creating a vapor of a volatile coagulant in said working zone, moving a base material through said field in the direction of its length, directing particles of liquid elastomer material in the form of a spray into said electrostatic field generally in the direction of its length, said field acting on said liquid particles to elongate and deposit them on said base and said vapor and said field acting to coagulate said elastomer material to form a spongy, mat-like finish on said base material.

3. The process of forming a mat finish product of elastomer material by depositing the elastomer material upon a base comprising establishing an electrostatic field having an average electric potential gradient of at least several thousand volts per inch of electrode separation, introducing elastomer material in particled liquid form in said field where said particles are elongated and deposited on a base.

4. The process which comprises establishing in the atmosphere of a working zone an electrostatic field having a local region in which the electrical gradient is adequate to produce ionization of the atmosphere, and introducing particles of settable elastomer in liquid form into said electrostatic field for electrostatically elongating said liquid particles, depositing them on a base and setting said deposited particles.

5. The method of making a matte finished product of elastomer material comprising the steps of establishing in the atmosphere of a working zone an electrostatic field having a local region in which the electrical gradient is adequate to produce ionization of the atmosphere, introducing the elastomer material in a finely divided, particled form into said electrostatic field for elongating the particles while they are in transit from their entering position in said working zone to their deposited position upon a base in said working zone, aiding the deposition of the elongated particles by utilizing the field's action in effecting said deposition, and retaining the modified particles in said field until curing has been effected.

6. The process which comprises establishing in the atmosphere of a working zone an electrostatic field having a local region in which the electrical gradient is adequate to produce ionization of the atmosphere, creating a spray of elastomer particles in liquid form, and introducing said spray into the gaseous atmosphere of the working zone for electrostatically elongating said elastomer particles and electrostatically depositing them on a base in said working zone.

EMERY P. MILLER.

REFERENCES CITED

The following references are of record in the file of this patent:

UNITED STATES PATENTS

| Number | Name | Date |
|---|---|---|
| 1,423,525 | Hopkinson | July 25, 1922 |
| 1,575,165 | Hopkinson | Mar. 2, 1926 |
| 1,841,076 | Zimmerli | Jan. 12, 1932 |
| 1,958,406 | Darrah | May 15, 1934 |
| 2,047,525 | Thode | July 14, 1936 |
| 2,191,827 | Benner et al. | Feb. 27, 1940 |
| 2,270,341 | Ransburg | Jan. 20, 1942 |
| 2,302,289 | Cook | Nov. 17, 1942 |
| 2,303,341 | Dufour et al. | Dec. 1, 1942 |
| 2,323,191 | Bennett | June 29, 1943 |
| 2,333,143 | Bennett | Nov. 2, 1943 |
| 2,334,648 | Ransburg et al. | Nov. 16, 1943 |

FOREIGN PATENTS

| Number | Country | Date |
|---|---|---|
| 291,471 | Great Britain | May 21, 1928 |
| 550,391 | Great Britain | Jan. 6, 1943 |